(12) United States Patent
Nurmi

(10) Patent No.: US 8,904,311 B2
(45) Date of Patent: Dec. 2, 2014

(54) METHOD, APPARATUS, AND COMPUTER PROGRAM PRODUCT FOR IMPLEMENTING A VARIABLE CONTENT MOVABLE CONTROL

(75) Inventor: Mikko Antero Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 443 days.

(21) Appl. No.: 12/873,630

(22) Filed: Sep. 1, 2010

(65) Prior Publication Data

US 2012/0053887 A1 Mar. 1, 2012

(51) Int. Cl.
*G06F 3/048* (2013.01)
*G06F 3/0488* (2013.01)
*H04M 1/67* (2006.01)
*G06F 3/0485* (2013.01)

(52) U.S. Cl.
CPC ............. *G06F 3/04883* (2013.01); *H04M 1/67* (2013.01); *H04M 2250/22* (2013.01); *G06F 3/0485* (2013.01)
USPC ............................ 715/862; 715/863; 715/864

(58) Field of Classification Search
None
See application file for complete search history.

(56) References Cited

U.S. PATENT DOCUMENTS

| 2006/0161871 | A1 | 7/2006 | Hotelling et al. | |
| 2007/0150842 | A1* | 6/2007 | Chaudhri et al. | 715/863 |
| 2008/0316183 | A1* | 12/2008 | Westerman et al. | 345/173 |
| 2009/0006991 | A1 | 1/2009 | Lindberg et al. | |
| 2010/0020035 | A1* | 1/2010 | Ryu et al. | 345/173 |
| 2010/0159995 | A1 | 6/2010 | Stallings et al. | |
| 2010/0248688 | A1* | 9/2010 | Teng et al. | 455/411 |
| 2010/0248689 | A1* | 9/2010 | Teng et al. | 455/411 |
| 2011/0041102 | A1* | 2/2011 | Kim | 715/863 |

FOREIGN PATENT DOCUMENTS

| EP | 2146271 A2 | 2/1982 |
| EP | 2144148 A2 | 1/2010 |
| EP | 2163977 A2 | 3/2010 |
| EP | 2166445 A2 | 3/2010 |
| KR | 2009-0069344 A | 6/2009 |
| WO | WO 2009/096646 A1 | 8/2009 |

OTHER PUBLICATIONS

International Search Report and Written Opinion from International Application No. PCT/IB2011/053781, mailed Jan. 26, 2012.
Office Action from Korean Application No. 10-2013-7008224, dated Mar. 27, 2014.

* cited by examiner

*Primary Examiner* — Matt Kim
*Assistant Examiner* — Hua Lu
(74) *Attorney, Agent, or Firm* — Alston & Bird LLP

(57) ABSTRACT

Various methods for implementing a variable content movable control are provided. One example method includes receiving an indication that a movable control is located at a second position along a defined path on a touch screen display. A first position, the second position, and at least a third position may defined along the defined path such that the movable control being located at the first position causes first content to be presented and the movable control being located at the third position causes a transition from a locked mode to an unlocked mode. The example method may further include causing second content to be presented on the touch screen display in response to at least receiving the indication that the movable control is located at the second position. Similar and related example methods, example apparatuses, and example computer program products are also provided.

18 Claims, 8 Drawing Sheets

US 8,904,311 B2

METHOD, APPARATUS, AND COMPUTER PROGRAM PRODUCT FOR IMPLEMENTING A VARIABLE CONTENT MOVABLE CONTROL

TECHNICAL FIELD

Embodiments of the present invention relate generally to implementing a user interface, and, more particularly, relate to a method, apparatus, and computer program product for implementing a variable content movable control.

BACKGROUND

As mobile computing and communications devices become increasingly flexible and convenient, users of the devices have become increasingly reliant on the functionality offered by the devices in both social and business settings. Due to advances made in the data storage capabilities, the communications capabilities, and the processing power of mobile devices, the functionality offered by the devices continues to evolve. As new functionalities are introduced or become popular, the user demand for convenient and intuitive user interface techniques also increases. To meet the demands of the users or encourage utilization of new functionality, innovation in the design and operation of user interfaces must keep pace.

SUMMARY

Example methods, example apparatuses, and example computer program products are described herein that provide for implementing a variable content movable control, which may be embodied, for example, as a slider control. One example method includes receiving an indication that a movable control is located at a second position along a defined path on a touch screen display. A first position, the second position, and at least a third position may be defined along the defined path such that the movable control being located at the first position causes first content to be presented, and the movable control being located at the third position causes a transition from a locked mode to an unlocked mode. The example method may further include causing second content to be presented on the touch screen display in response to at least receiving the indication that the movable control is located at the second position.

An additional example embodiment is an apparatus configured to implement a variable content movable control. The example apparatus may comprise at least one processor and at least one memory including computer program code, the at least one memory and the computer program code configured to, with the at least one processor, direct the apparatus to perform various functionality. In this regard, the example apparatus may be directed to receive an indication that a movable control is located at a second position along a defined path on a touch screen display. A first position, the second position, and at least a third position may be defined along the defined path such that the movable control being located at the first position causes first content to be presented, and the movable control being located at the third position causes a transition from a locked mode to an unlocked mode. The apparatus may be further directed to cause second content to be presented on the touch screen display in response to at least receiving the indication that the movable control is located at the second position.

Another example embodiment is a computer program product comprising a memory having computer program code stored thereon, wherein the computer program code is configured to direct an apparatus to perform various functionalities. In this regard, the program code may be configured to direct the apparatus to receive an indication that a movable control is located at a second position along a defined path on a touch screen display. A first position, the second position, and at least a third position may be defined along the defined path such that the movable control being located at the first position causes first content to be presented and the movable control being located at the third position causes a transition from a locked mode to an unlocked mode. The program code may be further configured to direct the apparatus to cause second content to be presented on the touch screen display in response to at least receiving the indication that the movable control is located at the second position.

Another example apparatus includes means for receiving an indication that a movable control is located at a second position along a defined path on a touch screen display. A first position, the second position, and at least a third position may be defined along the defined path such that the movable control being located at the first position causes first content to be presented, and the movable control being located at the third position causes a transition from a locked mode to an unlocked mode. The example apparatus may further include means for causing second content to be presented on the touch screen display in response to at least receiving the indication that the movable control is located at the second position.

BRIEF DESCRIPTION OF THE DRAWING(S)

Having thus described example embodiments of the invention in general terms, reference will now be made to the accompanying drawings, which are not necessarily drawn to scale, and wherein:

DETAILED DESCRIPTION

Figure 1:
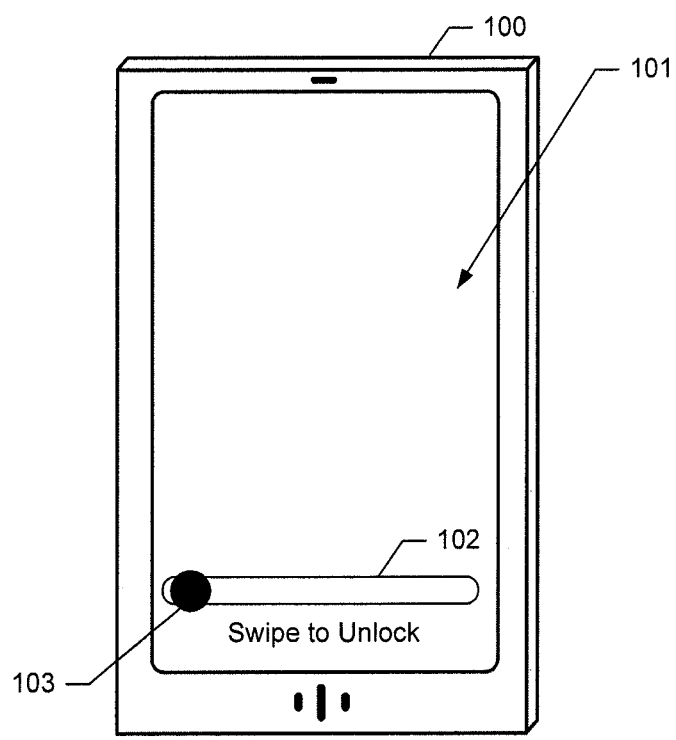
FIG. 1 illustrates an example mobile terminal with a movable control according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor (s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Various example embodiments of the present invention relate to methods, apparatuses, and computer program products for implementing a variable content movable control. A movable control may be a user interface control that is movable within a presented user interface on a display, such as a touch screen display. The movable control may be movable via user input to different positions within the presented user interface. According to some example embodiments, the movable control may be movable along a defined path that may, but need not, be presented on the display. The path may be linear (e.g., for a slider control), circular (e.g., for a wheel control), non-linear, piece-wise linear, or the like. In some example embodiments, the path may be defined by two points on the user interface and movement between the two points may be accomplished via any route. Depending on parameters, such as, for example, the position of the movable control and/or the velocity at which the movable control moved to the position, defined content may be presented to the user. According to some example embodiments, one or more of the defined positions along the defined path may cause, for example, an electronic handheld device to transition from a locked state to an unlocked state, or from an unlocked state to a locked state. As such, according to some example embodiments, a user may interact with the movable control to not only unlock a device, but also to quickly and efficiently display predefined content, possibly without unlocking the device.

FIG. 1 illustrates an example mobile terminal 100 with a touch screen display 101 that may be configured to implement the various example embodiments of the present invention. The mobile terminal 100 may be, for example, a smart phone that is configured to place and receive cellular telephone calls, and send data to and receive data from, for example, the Internet or other communications networks via the cellular network, a WiFi network, or other wired or wireless networks. The touch screen display 101 may be configured to sense a touch by a finger, stylus, or the like, and produce a signal indicating the location of the touch for analysis by a processor of the mobile terminal 100.

Because inadvertent input via a touch screen display can readily occur, for example, when a device is in the pocket of a user, the touch screen display 101 of the mobile terminal 100 may be placed in a locked mode when the touch screen display 101 is not being actively used to enter input. According to various example embodiments, when the touch screen display 101 of the mobile terminal 100 is placed in the locked mode, the mobile terminal 100 may not respond to a user's interaction with the touch screen display 101, except for a predefined type of deliberate interaction. By locking the touch screen display 101 in this manner, inadvertent execution of functionality (e.g., unintended phones calls) may be avoided.

According to various example embodiments, a predefined type of deliberate interaction with the touch screen display 101 to facilitate unlocking the touch screen display 101 and the mobile terminal 100, may be performed via a presented user interface. FIG. 1 illustrates an example user interface being presented by the touch screen display 101. The user interface may comprise a path 102 and a movable control 103. In some example embodiments, the path 102 may not be presented, but the movable control 103 may be configured to nonetheless move within the path 102. In some example embodiments, the movable control 103 need not be presented, and, for example, a background of the user interface may move to indicate movement of the movable control 103 to the user. When the touch screen display 101 is locked, interaction by the user with the movable control 103 may be responded to by the mobile terminal 100. In this regard, according to some example embodiments, the movable control 103 may rest, for example, on a left end of the path 102, when not interacted with by a user. However, a user may touch the touch screen display 101 at the position of the movable control 103 and move the movable control 103 along the path 102 towards, for example, the right using a swiping movement or gesture. For example, if the user moves the movable control 103 to the right end of the path 102, the touch screen display 101 may inform the processor of the mobile terminal 100 of the position of the movable control 103 and the touch screen display 101 may be unlocked. In some example embodiments, if the user discontinues interaction with the touch screen display 101, prior to reaching the right side of the path 102, the movable control 103 may automatically return to the left end of the path 102. According to some example embodiments, movement of the movable control 103 from the right end of the path 102 to the left end of the path 102 is unlikely to occur inadvertently, and, as such, is considered to be a deliberate action on behalf of the user to unlock the touch screen display 101. According to some example embodiments, the movable control 103 may be available for movement to lock the touch screen display 101, when the touch screen display is unlocked.

However, in some instances, when the touch screen display 101 is locked, a user may wish to view particular content available to the mobile terminal 100 without unlocking the touch screen display 101, or without completely unlocking the touch screen display 101. In this regard, according to various example embodiments, the movable control 103 may be used to trigger the presentation of content. Positions, possibly within a defined region, may be defined along the path 102 that may be used to trigger the presentation of particular content on the touch screen display 101 when the movable control 103 is located at the defined positions. In some example embodiments, particular content may be presented when the movable control 103 is located at any position within a defined region of the path 102. A user may move the movable control 103 to this defined position to view the associated content. Types of content (or content types) that may be associated with a defined position on the path 102 and presented may include, but not be limited to, a calendar (e.g., information about upcoming scheduled events), an email list (e.g., header information for recently received emails), a text message list (e.g., a list indicating the sender and the body of recently received text messages), an identifier of currently playing media (e.g., media content title, artist, album title, track number, media content playback duration, current playback time, and/or the like), a call list (e.g., a list of the contact names and/or phone numbers of recently received calls), a contact list, financial information (e.g., index, stock, and/or bond quotes), weather information (e.g., current temperature, forecast information, and/or the like), traffic information, the user's current location (e.g., a map indicating the location of the user), news (e.g., current headlines, sports scores, and/or the like), travel information (e.g., flight status and information), a webpage (e.g., a bookmarked webpage), a photograph (e.g., a series of photographs in a slide show), augmented reality view(s), the current time, social networking status updates, a set of miniapplications/widgets and/or the like. When the content is presented, according to some example embodiments, a user may also interact with the presented content, for example, at particular defined areas on the touch screen, to make a selection and cause the processor to perform a related action while the touch screen display 101 remains otherwise locked. For example, a user may select a contact from a presented contact list to initiate a phone call. In another example, a user may select calendar entry to display details of the calendar entry. In some example embodiments, the type of content displayed when the movable control 103 moves to the defined position may be configurable through settings by the user.

As further described below, according to some example embodiments, positioning the movable control within a defined region may cause content to be presented on a continuous canvas. In this regard, multiple types of content may be included on the continuous canvas and movement of the movable control 103 may cause relative movement of the content types on the continuous canvas. In this regard, defined positions within a defined region along the path 102 may be associated or linked to positions on the continuous canvas such that movement of the movable control to a particular position within the defined region of the path 102 may cause a particular, related position on the continuous canvas to be displayed, with the content types located at that position on the canvas.

FIGS. 2A through 2D illustrate an example implementation of an example embodiment where the movable control 103 is moved to defined positions 104, 105, 106, and 107 along the path 102. The figures show the defined positions as respective dotted lines as an indicator of the position. However, according to various example embodiments, an indication of the defined positions may or may not be presented by the touch screen display 101 on the path 102. When the movable control 103 is located at a defined position, associated content may be presented on the display. According to some example embodiments, when the movable control 103 moves between the defined positions, the movable control 103 may enter dead zones or dead positions that are not associated with a content type, and therefore an associated content type may not be displayed while the movable control 103 is located in these positions. Alternatively, in some example embodiments, content and associated content types may be presented on a continuous canvas that moves relative to the movement of the movable control 103 and is continuously presented throughout the movement of the movable control 103 between the defined positions. While the example embodiments indicated in FIGS. 2A through 2D illustrate four defined positions, it is contemplated that any number of defined positions for displaying associated content may be implemented.

According to some example embodiments, content may be presented when the movable control 103 moves to a particular defined position (e.g., defined positions 105 and 106) only if the velocity of the movable control 103 towards the defined position was less than a threshold velocity. In this regard, if a user moves the movable control 103 along the path 102 to a defined position slowly, the content may be presented. However, if the user moves the movable control 103 along the path 102 quickly (e.g., exceeding the velocity threshold), the content may not be presented, and for example when the movable control 103 reaches a defined position associated with the functionality to transition from the locked to the unlocked mode (or from the unlocked to the locked mode), the touch screen display 101 may be unlocked without having presented content associated with one or more of the other defined positions that may have been passed over during the movement of the movable control.

Figure 2B:
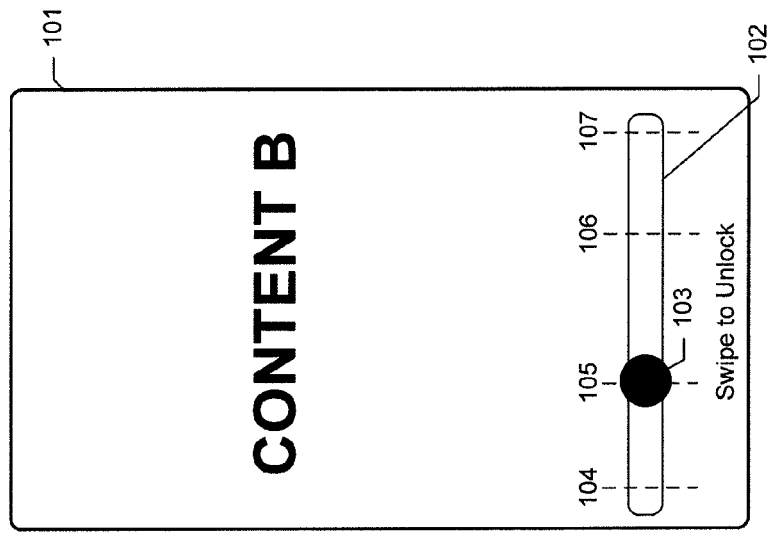
FIGS. 2A-2D illustrate an example scenarios involving movement of a movable control and presenting associated content according to an example embodiment of the present invention.
Figure 2A:
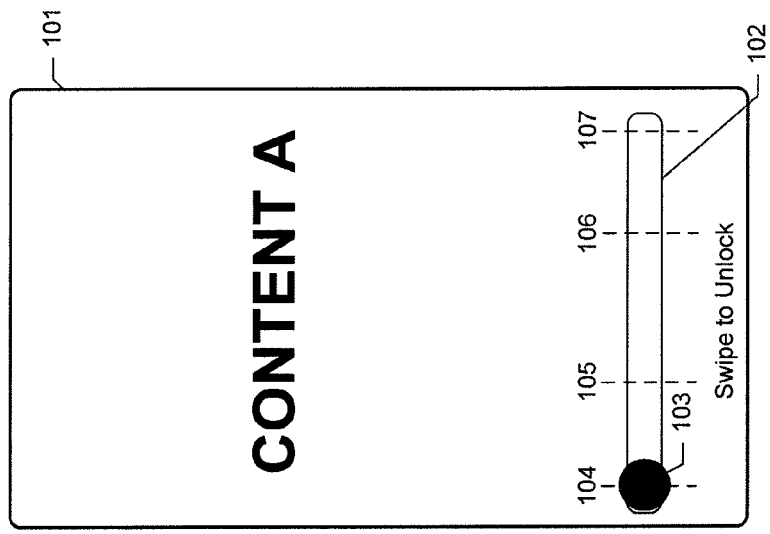

FIG. 2A illustrates the touch screen display 101 presenting CONTENT A, when the movable control 103 is located at a first defined position 104. According to some example embodiments, the movable control 103 may be configured to automatically return to the first defined position 104 when a user is not interacting with the movable control 103 and the touch screen display 101 is locked. Accordingly, the touch screen display 101 may send a signal to be received by a processor (or the processor may retrieve information from the touch screen display 101) indicating that the movable control 103 is located at the first defined position 104. In response, the processor may cause the touch screen display 101 to present CONTENT A, which may be any one of, or a combination of, the various content types described herein. In some example embodiments, CONTENT A may include various content types, such as, for example, the current time and date, a ringer/audio status, or any other content type defined herein.

FIG. 2B illustrates the touch screen display 101 presenting CONTENT B, when the movable control 103 is located at a second defined position 105. The movable control 103 may be located at the second defined position 105 because a user has touched the touch screen display 101 at a position of movable control 103 and moved the movable control 103 to the second defined position 105. Accordingly, the touch screen display 101 may send a signal to be received by a processor (or the processor may retrieve information from the touch screen display 101) indicating that the movable control 103 is located at the second defined position 105. In response, the processor may cause the touch screen display to present CONTENT B, which may be any one of, or a combination of, the various content types described herein. According to some example embodiments, the processor may cause the touch screen 101 to display CONTENT B only if the detected movement of the movable control from the defined position 104 to the defined position 105 did not exceed a threshold velocity. Further, according to some example embodiments, if after a threshold period of time, and after having exceeded the velocity threshold, the movable control remains at the position 105, then the processor may cause CONTENT B to be presented. According to some example embodiments, the movable control 103 may be moved back to the defined position 104, and CONTENT A may again be presented.

Figure 2D:
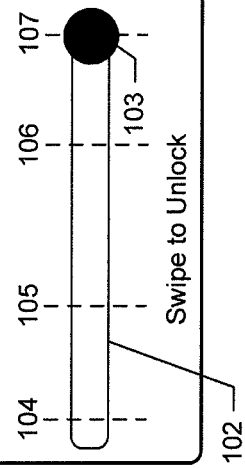
Figure 2C:
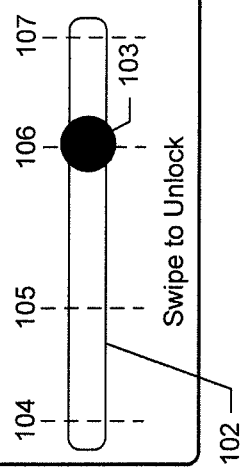

FIG. 2C illustrates the touch screen display 101 presenting CONTENT C, when the movable control 103 is located at a third defined position 106. The movable control 103 may be located at the third defined position 106 because a user has touched the touch screen display 101 at a position of movable control 103 and moved the movable control 103 to the third defined position 106 (e.g., while maintaining a velocity below a threshold). Accordingly, the touch screen display 101 may send a signal to be received by a processor (or the processor may retrieve information from the touch screen display 101) indicating that the movable control 103 is located at the second defined position 105. In response, the processor may cause the touch screen display to present CONTENT C, which may be any one of, or a combination of, the various content types described above. Additionally, as described above, as the movable control 103 moves along the path 102 from defined position 105 to defined position 106, CONTENT B and CONTENT C may be presented on a continuous canvas that moves relative to the movement of the movable control 103.

FIG. 2D illustrates the touch screen display 101 presenting CONTENT D, when the movable control 103 is located at a fourth defined position 107. The movable control 103 may be located at the fourth defined position 107 because a user has touched the touch screen display 101 at a position of movable control 103 and moved the movable control 103 to the fourth defined position 107. According to some example embodiments, the fourth defined position 107 may be associated with transitioning the touch screen display 101 from the locked mode to the unlocked mode. In the unlocked mode, the user may freely interact with the various functionalities that are supported by, for example, the mobile terminal 100. Upon releasing the movable control 103 while located at defined position 107, the path 102 may be removed from the display if it is being presented and, for example, a home screen may be displayed on the touch screen display 101 as CONTENT D. Accordingly, the touch screen display 101 may send a signal to be received by a processor (or the processor may retrieve information from the touch screen display 101) indicating that the movable control 103 is located at the fourth defined position 107. In response, the processor may cause the touch screen display 101 to transition to an unlocked mode and present CONTENT D, which may be a home screen or any one of, or a combination of, the various content types described above.

According to some example embodiments, movement to the defined position 107, being associated with the lock/unlock functionality, may cause CONTENT D to be displayed even if the threshold velocity is exceeded. In this regard, for example, in response to rapid movement of the movable control 103 in excess of the velocity threshold from defined position 104 to defined position 107, the processor may cause presentation of CONTENT A, when the movable control 103 is at defined position 104, and cause presentation of CONTENT D, when the movable control 103 is at defined position 107, without having displayed CONTENT B and CONTENT C as the movable control 103 passed over defined positions 105 and 106.

According to various example embodiments, the defined positions described in FIGS. 2A through 2D may also be defined within a range of positions that cause the touch screen display 101 to present the associated content. In this regard, the range of positions may have a width that allows, for example, a user to move the movable control 103 within the range of positions while maintaining the presentation of the particular content associated with the current position and range. The ranges may therefore have a transition threshold where the movable control 103 moves into a different range or the movable control 103 moves into a dead zone that is not associated with a content type. Through the use of a range of positions, unintentional small movements of the movable control 103 may not cause the presentation of desired content to be removed from the touch screen display 101. In some example embodiments, the ranges may be presented as color coded on the path 102.

FIGS. 3A through 3D illustrate another example implementation of an example embodiment where the movable control 103 is moved to defined positions within defined regions 108, 109, and 110 along a path 102. In this regard, since according to some example embodiments, regions may be a collection of adjacent positions, all positions within a defined region may therefore be defined. The figures show the defined regions 108, 109, and 110 as respective dotted rectangles as an indication of the area or width associated with each respective region, and the path 102 also as a dotted object. However, according to various example embodiments, the regions and the path need not be presented on the touch screen display 101. When the movable control 103 is located at a defined position within a defined region, associated content may be presented on the display. In some example embodiments, content and associated content types may be presented on a continuous canvas that moves relative to the movement of the movable control 103 as the movable control 103 moves within a defined region, and the continuous canvas may be continuously presented throughout the movement of the movable control 103 between the defined positions within a defined region. While the example embodiments indicated in FIGS. 3A through 3D illustrate three defined regions, it is contemplated that any number of defined regions for displaying associated content may be implemented.

According to some example embodiments, content may be presented when the movable control 103 moves to a defined position within a defined region (e.g., one of the continuous defined positions within defined region 109) only if the velocity of the movable control 103 towards the defined region and the region's defined positions is less than a threshold velocity. In this regard, if a user moves the movable control 103 along a path 102 slowly and into a defined region, the content may be presented. However, if the user moves the movable control 103 along the path 102 quickly and in excess of the threshold velocity, the content may not be presented, and for example when the movable control 103 is present within a defined region associated with the functionality to transition from the locked to the unlocked mode, e.g., defined region 109 (or similarly from the unlocked to the locked mode, e.g., defined region 108), the touch screen display 101 may be unlocked (or locked) without having presented content associated with one or more of the other defined regions that are passed over during movement of the movable control 103.

FIGS. 3A through 3D describe a scenario that involves the implementation of a continuous canvas. In this regard, the continuous canvas may be associated with the defined region 109. Each defined position within the defined region 109 may correspond to a location on the continuous canvas, such that when the movable control 103 is located at a defined position within the defined region 109, a portion of the continuous canvas associated with that defined position within the defined region may be presented.

Figure 3B:
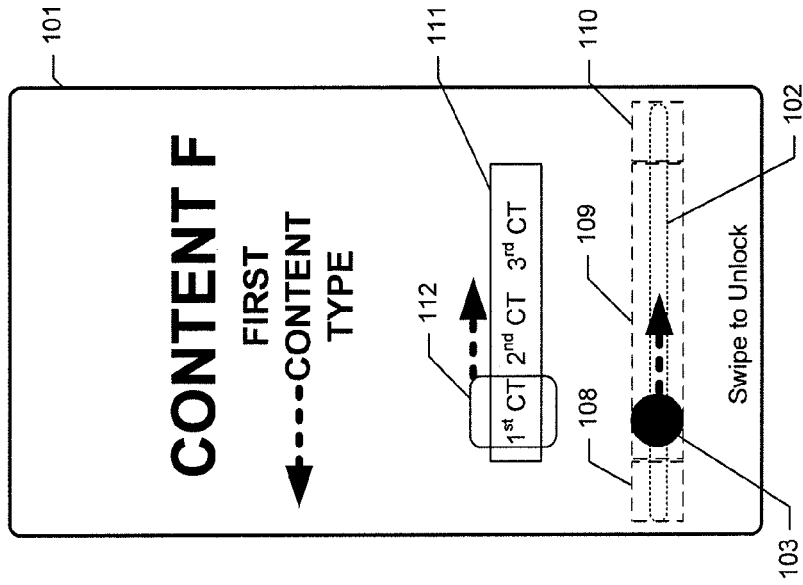
FIGS. 3A-3D illustrate additional example scenarios involving movement of a movable control and presenting associated content according to an example embodiment of the present invention.
Figure 3A:
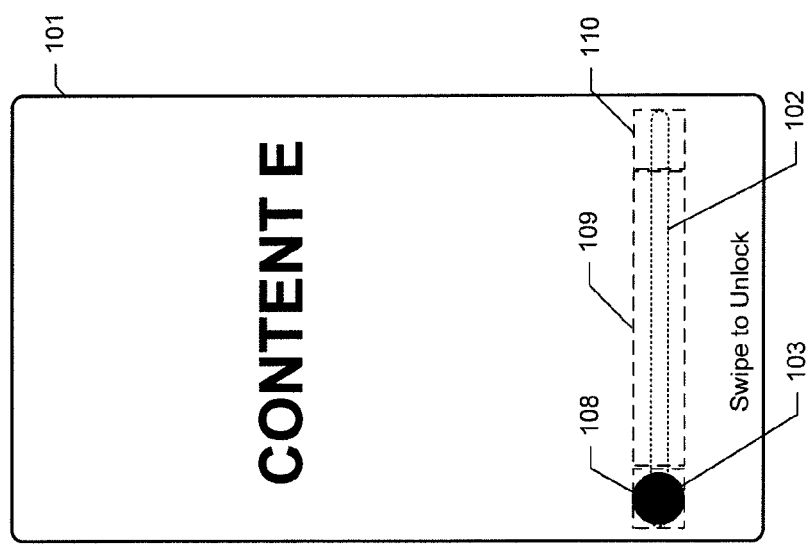

FIG. 3A illustrates the touch screen display 101 presenting CONTENT E, when the movable control 103 is located in a first defined region 108. According to some example embodiments, the movable control 103 may be configured to automatically return to the first defined region 108 when a user is not interacting with the movable control 103 and the touch screen display 101 is locked. Further, according to some example embodiments, when the touch screen display 101 is unlocked, and a user wishes to lock the touch screen display 101, the movable control 103 may be moved from an unlocked defined position (e.g., on the right end of the path 102 within defined region 110) to a locked defined position (e.g., on the left end of the path 102 within the defined region 108). The touch screen display 101 may send a signal to be received by a processor (or the processor may retrieve information from the touch screen display 101) indicating that the movable control 103 is located at a defined position within the first defined region 108. In response, the processor may cause the touch screen display 101 to present CONTENT E, which may be any one of, or a combination of, the various content types described above. In some example embodiments, CONTENT E may include various content types, such as, for example, the current time and date, a ringer/audio status, or any other content type defined herein.

FIG. 3B illustrates the touch screen display 101 presenting CONTENT F, when the movable control 103 is located at a defined position within defined region 109. The movable control 103 may be located at the defined position within the defined region 109 because a user has touched the touch screen display 101 at a position of movable control 103 and moved the movable control 103 to the defined position within the defined region 109. Accordingly, the touch screen display 101 may send a signal to be received by a processor (or the processor may retrieve information from the touch screen display 101) indicating that the movable control 103 is located at the defined position within the defined region 109. In response, the processor may cause the touch screen display to present CONTENT F, which may be any one of, or a combination of, the various content types described herein. According to some example embodiments, the processor may cause the touch screen 101 to display CONTENT F only if the detected movement of the movable control 103 to the defined position within the defined region 109 did not exceed a threshold velocity. Further, according to some example embodiments, if after a threshold period of time, and after having exceeded the velocity threshold, the movable control remains within the defined region 109, then the processor may cause CONTENT F to be presented. According to some example embodiments, the movable control 103 may be moved back to the defined region 108, and CONTENT E may again be presented.

CONTENT F, which is associated with defined region 109, may include a plurality of types of content, as defined herein, to populate the continuous canvas. FIG. 3B indicates that a FIRST CONTENT TYPE is presented within the touch screen display 101 when the movable control 103 is positioned as indicated in FIG. 3B. The dotted arrows, associated with the FIRST CONTENT TYPE and the movable control 103, are provided to illustrate the relative movement of the FIRST CONTENT TYPE to the movement of the movable control 103. In this regard, as the movable control 103 moves to the right, the FIRST CONTENT TYPE may responsively move to the left and possibly off the touch screen display 101. The FIRST CONTENT TYPE therefore may move relative to the movement of the movable control 103.

Additionally, while the FIRST CONTENT TYPE is presented on the touch screen display 101, the user may wish to interact with information being provided as the FIRST CONTENT TYPE. In this regard, a user select a content item (e.g., a contact, a scheduled event, an email, etc.) and the processor may receive an indication of the selection and perform an action based at least on the selection (e.g., initiate a phone call, present event details, open an email, etc.).

Further, FIG. 3B illustrates a canvas map according to some example embodiments. In some example embodiments where content associated with a defined region 109 is provided on a continuous canvas, a canvas map 111 may be presented on the touch screen display 101. The canvas map 111 may include representations of content types that are included on the continuous canvas and the relative positions of those content types. For example, FIG. 3B illustrates canvas map 111 that indicates three content types (CTs), namely $1^{st}$ CT which corresponds to the FIRST CONTENT TYPE, $2^{nd}$ CT which corresponds to the SECOND CONTENT TYPE (see FIG. 3C), and $3^{rd}$ CT which corresponds with the THIRD CONTENT TYPE (not depicted). The canvas map 111 may therefore be, for example, a smaller or thumbnail representation of the continuous canvas, which may operate to assist a user with navigating to desired content types within the content provided on the continuous canvas due to the positional relationship between the canvas map 111 and the continuous canvas. To further assist with navigation, the canvas map may also be associated with a view window 112, which indicates on the canvas map 111, the portion of continuous canvas and the content type or types that are currently being presented on the touch screen display 101. As indicated by the arrow associated with the view window 112, when the movable control 103 moves, the display window 112 also moves in a relative fashion because the continuous canvas is responsively moving.

Figure 3C:
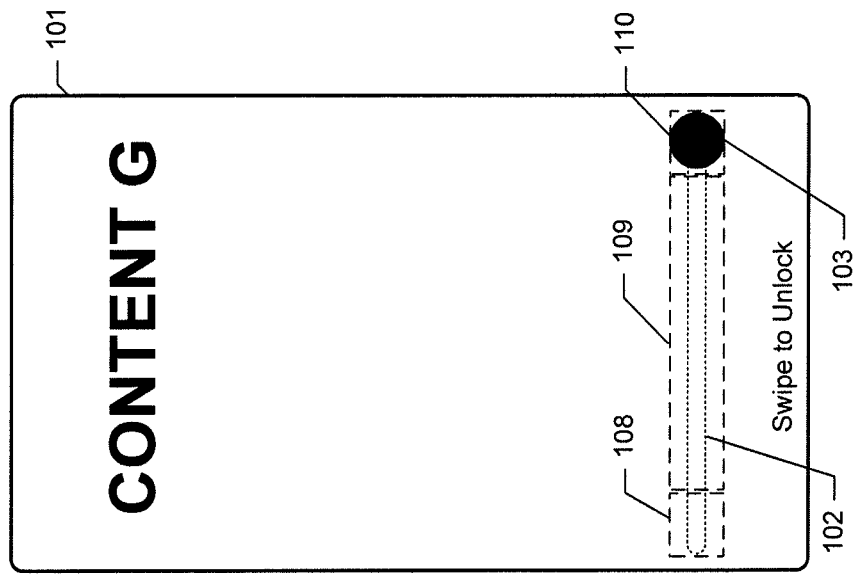

FIG. 3C illustrates the touch screen display 101, again, presenting CONTENT F, because, although the movable control 103 has moved, the movable control 103 continues to be located at a defined position within defined region 109. Accordingly, the touch screen display 101 may send a signal to be received by a processor (or the processor may retrieve information from the touch screen display 101) indicating that the movable control 103 is located at the defined position within the defined region 109. In response, the processor may cause the touch screen display to present CONTENT F, which may be any one of, or a combination of, the various content types described herein.

Due to the movement of the movable control 103 within the defined region 109, the continuous canvas has also moved, relative to the movement of the movable control 103. In this regard, the movable control 103 has moved to a position where a portion of the FIRST CONTENT TYPE continues to be presented as it is leaving the screen and a portion of the SECOND CONTENT TYPE may be presented as it enters the screen. The view window 112 similarly indicates in FIG. 3C that portions of the FIRST CONTENT TYPE and the SECOND CONTENT TYPE are being presented by the touch screen display 101.

Figure 3D:
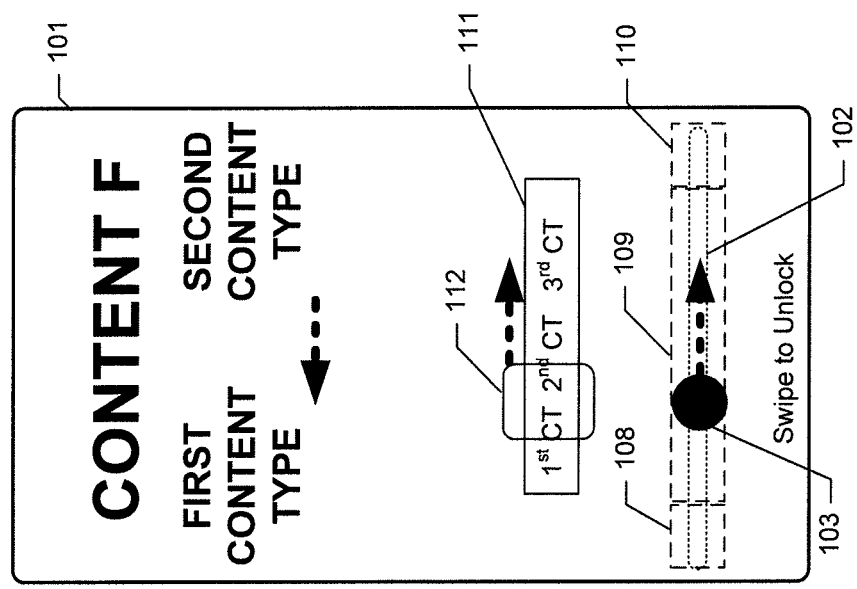

FIG. 3D illustrates the touch screen display 101 presenting CONTENT G, when the movable control 103 is located within defined region 110. The movable control 103 may be located within defined region 110 because a user has touched the touch screen display 101 at a position of the movable control 103 and moved the movable control 103 to a defined position within the defined region 110. According to some example embodiments, the defined region 110 may be associated with transitioning the touch screen display 101 from the locked mode to the unlocked mode. In the unlocked mode, the user may freely interact with the various functionalities that are supported by, for example, the mobile terminal 100. Upon releasing the movable control 103 while located within the defined region 110, a home screen, for example, may be displayed on the touch screen display 101 as a content type within CONTENT G. Accordingly, the touch screen display 101 may send a signal to be received by a processor (or the processor may retrieve information from the touch screen display 101) indicating that the movable control 103 is located within the defined region 110. In response, the processor may cause the touch screen display 101 to transition to an unlocked mode and present CONTENT G, which may be a home screen or any one of, or a combination of, the various content types described above. According to some example embodiments, movement to a defined position within the defined region 110, which is associated with the lock/unlock functionality, may cause CONTENT G to be displayed even if the threshold velocity is exceeded. In this regard, for example, in response to rapid movement of the movable control 103 in excess of the velocity threshold to a defined position within the defined region 110 from, for example, a defined position within the defined region 108, the processor may cause presentation of CONTENT E, when the movable control 103 is within the defined region 108, and presentation of CONTENT G, when the movable control 103 is within the defined region 110, without having displayed CONTENT F as the movable control 103 passed over the defined region 109.

Figure 4A:
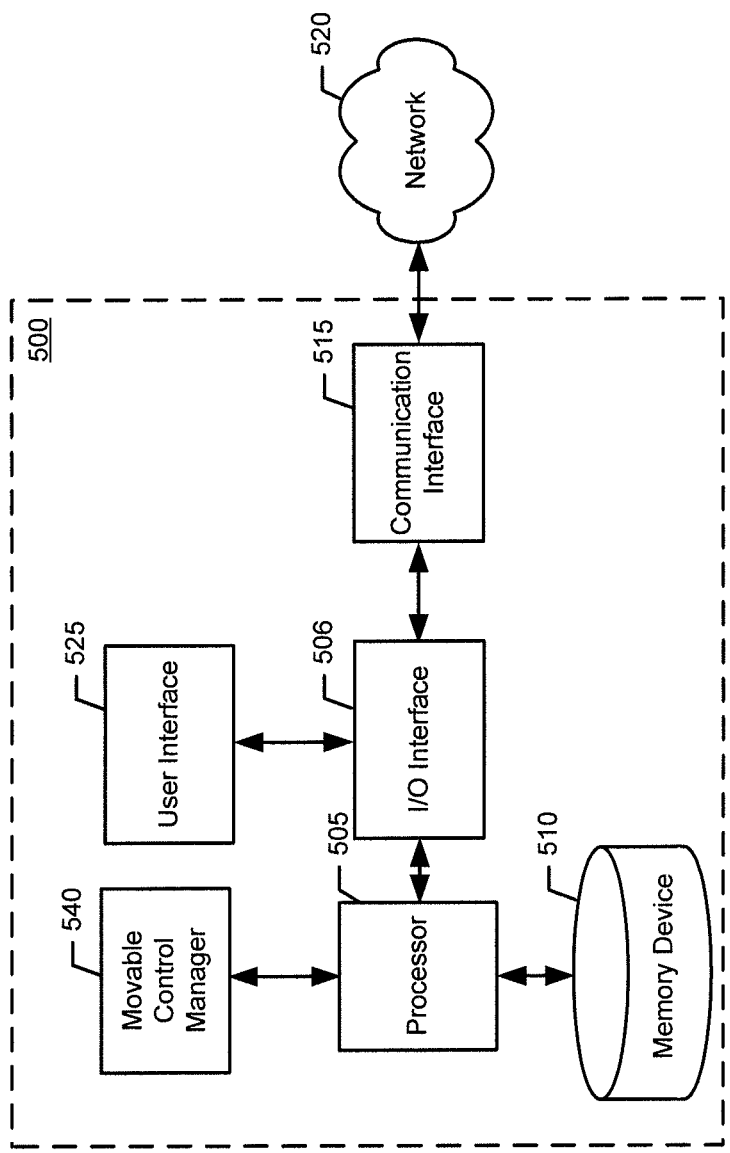
FIG. 4A illustrates a block diagram of an apparatus and associated system for implementing a variable content movable control according to some example embodiments of the present invention.
Figure 4B:
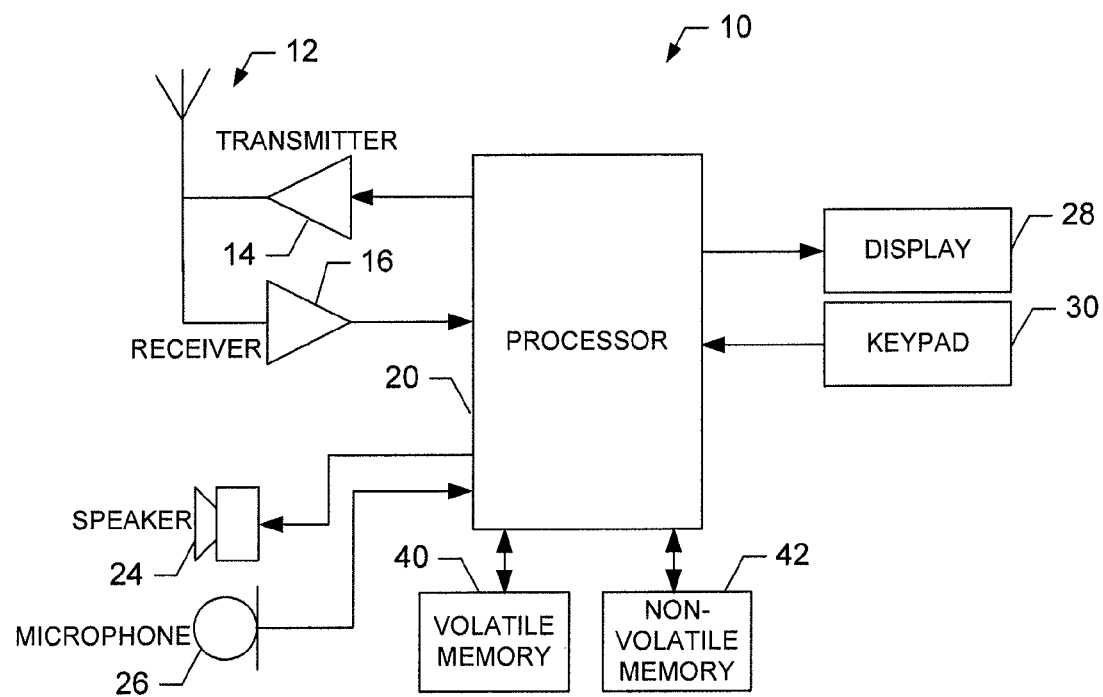
FIG. 4B illustrates a block diagram of a mobile terminal configured for implementing a variable content movable control according to some example embodiment of the present invention.

The description provided above and generally herein illustrates example methods, example apparatuses, and example computer program products for implementing a variable content movable control. FIGS. 4A and 4B depict example apparatuses that may be configured to perform various functionalities as described herein, including those described with respect to operations of the flowchart of FIG. 5, and the operations otherwise described herein.

Referring now to FIG. 4A, an example embodiment of the present invention is depicted as apparatus 500. The mobile terminal 100 may be one example embodiment of apparatus 500. Apparatus 500 may, be embodied as, or included as a component of, a communications device with wired and/or wireless communications capabilities. In some example embodiments, the apparatus 500 may be part of a communications device, such as a stationary or a mobile communications terminal. As a mobile device, the apparatus 500 may be a mobile and/or wireless communications node such as, for example, a mobile and/or wireless server, computer, access point, communications switching device, handheld wireless device (e.g., telephone, portable digital assistant (PDA), mobile television, gaming device, camera, video recorder, audio/video player, radio, digital book reader, and/or a global positioning system (GPS) device), any combination of the aforementioned, or the like. Regardless of the type of communications device, apparatus 500 may also include computing capabilities.

FIG. 4A illustrates a functional block diagram of example components of the apparatus 500. The example apparatus 500 includes or is otherwise in communication with a processor 505, a memory device 510, an Input/Output (I/O) interface 506, a communications interface 515, and a movable control manager 540. The processor 505 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes the apparatus 500 to perform various functionalities described herein.

Whether configured as hardware or via instructions stored on a computer-readable storage medium, or by a combination thereof, the processor 505 may be an entity and means capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a communications server or mobile terminal) configured for employing example embodiments of the present invention by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 includes Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505. In some example embodiments, the memory device 510 may be in communication with the processor 505 and/or other components via a shared bus.

Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 could be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the I/O interface may embody or be in communication with a bus that is shared by multiple components. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention.

In some embodiments, the apparatus 500 or some of the components of apparatus 500 (e.g., the processor 505 and the memory device 510) may be embodied as a chip or chip set. In other words, the apparatus 500 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 500 may therefore, in some cases, be configured to implement embodiments of the present invention on a single chip or as a single "system on a chip." As such, in some cases, a chip or chipset may constitute means for performing the functionalities described herein and with respect to the processor 505.

The communication interface 515 may be any device or means embodied in hardware, a computer program product, or a combination of hardware and a computer program product that is configured to receive and/or transmit data from/to a network 520 and/or any other device or module in communication with the example apparatus 500. The communications interface may be configured to communicate information via any type of wired or wireless connection, and via any type of communications protocol, such as a communications protocol that supports cellular communications. According to various example embodiments, the communication interface 515 may be configured to support the transmission and reception of communications in a variety of networks including, but not limited to Internet Protocol-based networks (e.g., the Internet), cellular networks, or the like. Further, the communications interface 515 may be configured to support device-to-device communications. Processor 505 may also be configured to facilitate communications via the communications interface 515 by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The user interface 525 may be in communication with the processor 505 to receive user input via the user interface 525 and/or to present output to a user as, for example, audible, visual, mechanical, or other output indications. The user interface 525 may include, for example, a keyboard, a mouse, a joystick, a display (e.g., a touch screen display), a microphone, a speaker, or other input/output mechanisms. Further, the processor 505 may comprise, or be in communication with, user interface circuitry configured to control at least some functions of one or more elements of the user interface. The processor 505 and/or user interface circuitry may be configured to control one or more functions of one or more elements of the user interface through computer program instructions (e.g., software and/or firmware) stored on a memory accessible to the processor 505 (e.g., volatile memory, non-volatile memory, and/or the like). The user interface 525 may also be configured to support the implementation of haptic feedback. In this regard, the user interface 525, as controlled by processor 505, may include a vibra, a piezo, and/or an audio device configured for haptic feedback as described herein. In some example embodiments, the user interface circuitry is configured to facilitate user control of at least some functions of the apparatus 500 through the use of a display and configured to respond to user inputs. The processor 505 may also comprise, or be in communication with, display circuitry configured to display at least a portion of a user interface, the display and the display circuitry configured to facilitate user control of at least some functions of the apparatus 500.

The user interface 525 may include, as mentioned above, one or more touch screen displays. A touch screen display may be configured to visually present graphical information to a user. The touch screen display, which may be embodied as any known touch screen display, may also include a touch detection surface configured to enable touch recognition by any suitable technique, such as resistive, capacitive, infrared, strain gauge, surface wave, optical imaging, dispersive signal technology, acoustic pulse recognition, or other like techniques. In some example embodiments, that touch screen display may be configured to operate in a hovering mode, where movements of a finger, stylus, or other implement can be sensed when sufficiently near the touch screen surface, without physically touching the surface. The touch screen displays may include all of the hardware necessary to detect a touch when contact is made with the touch detection surface and send an indication to, for example, processor 505 indicating characteristics of the touch such as location information. A touch event may occur when an object, such as a stylus, finger, pen, pencil or any other pointing device, comes into contact with a portion of the touch detection surface of the touch screen display in a manner sufficient to register as a touch. The touch screen display may therefore be configured to generate touch event location data indicating the location of the touch event on the screen.

The movable control manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the movable control manager 540 as described herein. In an example embodiment, the processor 505 includes, or controls, the movable control manager 540. The movable control manager 540 may be, partially or wholly, embodied as processors similar to, but separate from processor 505. In this regard, the movable control manager 540 may be in communication with the processor 505. In various example embodiments, the movable control manager 540 may, partially or wholly, reside on differing apparatuses such that some or all of the functionality of the movable control manager 540 may be performed by a first apparatus, and the remainder of the functionality of the movable control manager 540 may be performed by one or more other apparatuses.

Further, the apparatus 500 and the processor 505 may be configured to perform the following functionality via movable control manager 540. Performance of the functionality of the movable control manager 540 describes various example method embodiments. The movable control manager 540 may be configured to cause or direct means such as the processor 505 and/or the apparatus 500 to perform various functionalities, such as those described with respect to FIGS. 1, 2A-2D, 3A-3D, and 5, and as generally described herein.

Figure 5:
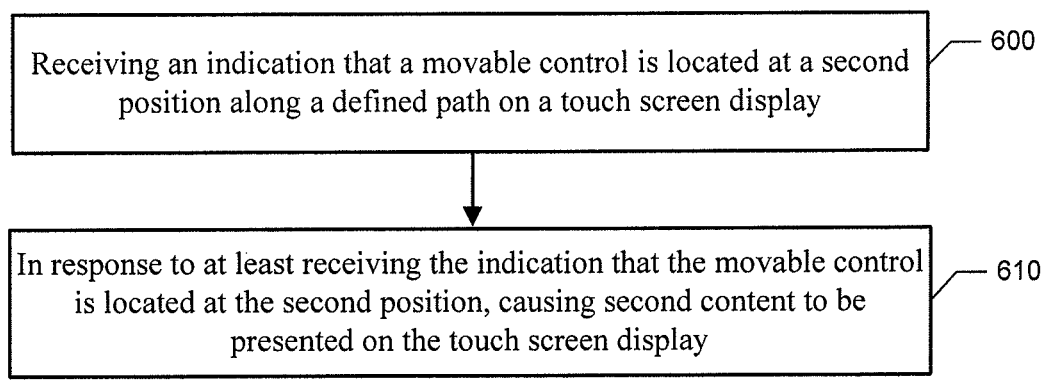
FIG. 5 is a flowchart of an example method for implementing a variable content movable control according to an example embodiment of the present invention.

For example, with reference to FIG. 5, the movable control manager 540 may be configured to receive an indication that a movable control is located at a second position along a defined path on a touch screen display at 600. In this regard, a first position, the second position, and at least a third position may be defined along the defined path such that the movable control being located at the first position causes first content to be presented, and the movable control being located at the third position causes a transition from a locked mode to an unlocked mode. The movable control manager 540 may be further configured to cause second content to be presented on the touch screen display in response to at least receiving the indication that the movable control is located at the second position at 610.

Additionally or alternatively, in some example embodiments, the second position may be one of a number of positions within a defined region that cause the second content to be presented. Further, according to some example embodiments, the movable control manager 540 may be additionally or alternatively configured to cause the second content to be presented, where the second content includes content of at least a first content type and a second content type. Additionally or alternatively, according to some example embodiments, the movable control manager 540 may be configured to receive an indication that the movable control is moving to a fourth position, and cause presentation of the first content type and the second content type in relative motion with the movement of the movable control to the fourth position, where the fourth position one of the number of defined positions within the defined region that causes the second content to be presented. According to some example embodiments, the movable control manager 540 may be configured to, additionally or alternatively, cause the second content to be presented in response determining that the movable control remained below a threshold velocity while moving to the second position. Additionally or alternatively, the movable control manager 540 may be configured, according to some example embodiments, to cause presentation of a map (e.g., canvas map 111) representative of the second content, where the map includes a cursor (e.g., view window 112) indicating a position of a currently presented view of the second content. The movable control manager 540 may additionally or alternatively be configured, according to some example embodiments, to receive an indication that an item within the second content has been selected by a user, and perform an action in response to at least the selection of the item.

Referring now to FIG. 4B, a more specific example apparatus in accordance with various embodiments of the present invention is provided. The example apparatus of FIG. 4 is a mobile terminal 10 configured to communicate within a wireless network, such as a cellular communications network. The mobile terminal 10 may be configured to perform the functionality of the mobile terminal 100 or apparatus 500 as described herein. More specifically, the mobile terminal 10 may be caused to perform the functionality described with respect to FIGS. 1, 2A-2D, 3A-3B, and 5 via the processor 20. In this regard, according to some example embodiments, the processor 20 may be configured to perform the functionality described with respect to the movable control manager 540. Processor 20 may be an integrated circuit or chip configured similar to the processor 505 together with, for example, the I/O interface 506. Further, volatile memory 40 and non-volatile memory 42 may be configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, displays 28 (which may be touch screen displays), and the keypad 30 may be included as parts of a user interface.

FIG. 5 illustrates flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIG. 5 and otherwise described herein may be stored on a memory device, such as memory device 510, volatile memory 40, or volatile memory 42, of an example apparatus, such as example apparatus 500 or mobile terminal 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    receiving an indication that a movable control is located at a second position along a defined path on a touch screen display, wherein a first position, the second position, and at least a third position are defined along the defined path such that the movable control being located at the first position causes first content associated with the first position to be presented and the movable control being located at the third position causes a transition from a locked mode to an unlocked mode; and
    in response to at least receiving the indication that the movable control is located at the second position, causing second content associated with the second position to be presented on the touch screen display, wherein the second content is of a predefined content type and content of the predefined content type is configured to be viewable in the locked mode, the configuration being initiated in the unlocked mode by a user;
    wherein the first content and second content are caused to be presented prior to the transition from the locked mode to the unlocked mode, and wherein the first content and second content are of different content types.

2. The method of claim 1, wherein receiving the indication that the movable control is located at the second position includes receiving the indication that the movable control is located at the second position, the second position being one of a number of positions within a defined region that cause the second content to be presented.

3. The method of claim 1, wherein receiving the indication that the movable control is located at the second position includes receiving the indication that the movable control is located at the second position, the second position being one of a number of positions within a defined region that cause the second content to be presented;
    wherein causing the second content to be presented display includes causing the second content to be presented, the second content including content of at least a first content type and a second content type; and
    wherein the method further comprises:
        receiving an indication that the movable control is moving to a fourth position; and
        causing presentation of the first content type and the second content type in relative motion with the movement of the movable control to the fourth position, the fourth position being one of the number of defined positions within the defined region.

4. The method of claim 1, wherein causing the second content to be presented includes causing the second content to be presented in response determining that the movable control remained below a threshold velocity while moving to the second position.

5. The method of claim 1, wherein causing the second content to be presented includes causing the second content to be presented, the second content including content of at least a first content type and a second content type; and
    wherein the method further comprises causing presentation of a map representative of the second content, the map including a cursor indicating a position of a currently presented view of the second content.

6. The method of claim 1, further comprising receiving an indication that an item within the second content has been selected by the a user; and performing an action in response to at least the selection of the item.

7. The method according to claim 1, wherein the first content transitions off the touch screen display by a sliding movement of the first content as the second content transitions onto the touch screen display by a sliding movement of the second content.

8. An apparatus comprising at least one processor and at least one memory including computer program code, the at least one memory and the computer program code configured to, with the at least one processor, direct the apparatus at least to:
    receive an indication that a movable control is located at a second position along a defined path on a touch screen display, wherein a first position, the second position, and at least a third position are defined along the defined path such that the movable control being located at the first position causes first content associated with the first position to be presented and the movable control being located at the third position causes a transition from a locked mode to an unlocked mode; and
    cause second content associated with the second position to be presented on the touch screen display in response to at least receiving the indication that the movable control is located at the second position, wherein the second content is of a predefined content type and content of the predefined content type is configured to be viewable in the locked mode, the configuration being initiated in the unlocked mode by a user;
    wherein the first content and second content are caused to be presented prior to the transition from the locked mode to the unlocked mode, and wherein the first content and second content are of different content types.

9. The apparatus of claim 8, wherein the apparatus directed to receive the indication that the movable control is located at the second position includes being directed to receive the indication that the movable control is located at the second position, the second position being one of a number of positions within a defined region that cause the second content to be presented.

10. The apparatus of claim 8, wherein the apparatus directed to cause the second content to be presented includes being directed to cause the second content to be presented, the second content including content of at least a first content type and a second content type.

11. The apparatus of claim 8, wherein the apparatus directed to receive the indication that the movable control is located at the second position includes being directed to receive the indication that the movable control is located at the second position, the second position being one of a number of positions within a defined region that cause the second content to be presented;

wherein the apparatus directed to cause the second content to be presented display includes being directed to cause the second content to be presented, the second content including content of at least a first content type and a second content type; and wherein the apparatus is further directed to:
receive an indication that the movable control is moving to a fourth position; and
cause presentation of the first content type and the second content type in relative motion with the movement of the movable control to the fourth position, the fourth position being one of the number of defined positions within the defined region.

12. The apparatus of claim 8, wherein the apparatus directed to cause the second content to be presented includes being directed to cause the second content to be presented, the second content including content of at least a first content type and a second content type; and
wherein the apparatus is further directed to cause presentation of a map representative of the second content, the map including a cursor indicating a position of a currently presented view of the second content.

13. The apparatus of claim 8, wherein the apparatus is further directed to receive an indication that an item within the second content has been selected by the user; and perform an action in response to at least the selection of the item.

14. The apparatus of claim 8, wherein the apparatus comprises a mobile terminal.

15. The apparatus of claim 14, wherein the apparatus further comprises user interface circuitry and components including the touch screen display.

16. A computer program product comprising a non-transitory computer-readable storage medium having program code stored thereon, the program code configured to direct an apparatus to:
receive an indication that a movable control is located at a second position along a defined path on a touch screen display, wherein a first position, the second position, and at least a third position are defined along the defined path such that the movable control being located at the first position causes first content associated with the first position to be presented and the movable control being located at the third position causes a transition from a locked mode to an unlocked mode; and
cause second content associated with the second position to be presented on the touch screen display in response to at least receiving the indication that the movable control is located at the second position, wherein the second content is of a predefined content type and content of the predefined content type is configured to be viewable in the locked mode, the configuration being initiated in the unlocked mode by a user;
wherein the first content and second content are caused to be presented prior to the transition from the locked mode to the unlocked mode, and wherein the first content and second content are of different content types.

17. The computer program product of claim 16, wherein the program code configured to direct the apparatus to cause the second content to be presented includes being configured to direct the apparatus to cause the second content to be presented, the second content including content of at least a first content type and a second content type.

18. The computer program product of claim 16, wherein the program code configured to direct the apparatus to receive the indication that the movable control is located at the second position includes being configured to direct the apparatus to receive the indication that the movable control is located at the second position, the second position being one of a number of positions within a defined region that cause the second content to be presented;
wherein the program code configured to direct the apparatus to cause the second content to be presented display includes being configured to direct the apparatus to cause the second content to be presented, the second content including content of at least a first content type and a second content type; and
wherein the program code is further configured to direct the apparatus to:
receive an indication that the movable control is moving to a fourth position; and
cause presentation of the first content type and the second content type in relative motion with the movement of the movable control to the fourth position, the fourth position being one of the number of defined positions within the defined region.

* * * * *

UNITED STATES PATENT AND TRADEMARK OFFICE
CERTIFICATE OF CORRECTION

PATENT NO. : 8,904,311 B2
APPLICATION NO. : 12/873630
DATED : December 2, 2014
INVENTOR(S) : Nurmi Page 1 of 1

It is certified that error appears in the above-identified patent and that said Letters Patent is hereby corrected as shown below:

In the claims:

Column 18,
Line 16, "the a user" should read --the user--.

Signed and Sealed this
Twenty-first Day of July, 2015

Michelle K. Lee
*Director of the United States Patent and Trademark Office*